(12) United States Patent
McClendon et al.

(10) Patent No.: US 8,037,958 B2
(45) Date of Patent: Oct. 18, 2011

(54) LAYOUT OF COMPACT ALL TERRAIN VEHICLE FOR FUEL TANK, INTAKE DUCT, AND EXHAUST DUCT POSITIONING

(75) Inventors: William McClendon, Newnan, GA (US); Christopher Gervais, Newnan, GA (US); Bryan Harper, Newnan, GA (US)

(73) Assignees: Yamaha Motor Manufacturing Corporation of America, Newnan, GA (US); Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/616,281

(22) Filed: Nov. 11, 2009

(65) Prior Publication Data

US 2011/0108349 A1    May 12, 2011

(51) Int. Cl.
  B60K 11/06   (2006.01)
  B60K 13/06   (2006.01)
(52) U.S. Cl. .................. 180/68.1; 180/68.2; 180/296
(58) Field of Classification Search .............. 180/215, 180/233, 210, 311, 312, 234, 240, 244, 370, 180/296, 291
See application file for complete search history.

(56) References Cited

U.S. PATENT DOCUMENTS

| | | | | |
|---|---|---|---|---|
| 4,697,665 A * | 10/1987 | Eastman et al. | ............... | 180/230 |
| 4,712,629 A * | 12/1987 | Takahashi et al. | ............ | 180/68.1 |
| 4,744,432 A * | 5/1988 | Shibata et al. | ............... | 180/68.1 |
| 6,705,417 B2 * | 3/2004 | Kitai et al. | .................... | 180/68.1 |
| 6,823,956 B2 * | 11/2004 | Shimizu | ........................ | 180/68.1 |
| 6,920,949 B2 * | 7/2005 | Matsuura et al. | ............ | 180/68.2 |
| 7,347,296 B2 * | 3/2008 | Nakamura et al. | ........... | 180/68.1 |
| 7,475,748 B2 * | 1/2009 | Nakamura et al. | ........... | 180/68.1 |
| 7,828,098 B2 * | 11/2010 | Yamamoto et al. | .......... | 180/68.5 |
| 2004/0188167 A1 * | 9/2004 | Kuroki et al. | ................. | 180/312 |
| 2008/0017434 A1 * | 1/2008 | Harper et al. | ................. | 180/370 |
| 2008/0099263 A1 * | 5/2008 | Takeshima et al. | .......... | 180/68.3 |
| 2008/0257630 A1 * | 10/2008 | Takeshima et al. | ........... | 180/248 |
| 2008/0257632 A1 * | 10/2008 | Takeshima et al. | ........... | 180/312 |
| 2009/0127013 A1 * | 5/2009 | Sigmund | ........................ | 180/233 |
| 2009/0183939 A1 * | 7/2009 | Smith et al. | .................... | 180/311 |
| 2010/0044139 A1 * | 2/2010 | Kurokawa et al. | ............ | 180/311 |
| 2010/0147615 A1 * | 6/2010 | Tsujii et al. | .................... | 180/215 |
| 2010/0206655 A1 * | 8/2010 | Stilwell et al. | ................ | 180/370 |
| 2011/0108349 A1 * | 5/2011 | McClendon et al. | ......... | 180/311 |

* cited by examiner

*Primary Examiner* — Paul N Dickson
*Assistant Examiner* — Karen A Beck
(74) *Attorney, Agent, or Firm* — Keating & Bennett, LLP

(57) ABSTRACT

Fuel tank 10 is provided such that its front end 10' is located to the rear of the rear end 20a' of crankcase 20a; air intake duct 34 of transmission case 21a has an intake port 34b arranged above air intake opening 21b of transmission case 21a, with at least a portion of it being forward of the rear end part 8" of handlebar member 8 at the time of maximum turning thereof; and exhaust duct 35 has an exhaust port 35b arranged above exhaust opening 21c of transmission case 21a, with at least a portion of it being forward of the rear end part 8" of handlebar member 8 at the time of maximum turning thereof.

13 Claims, 12 Drawing Sheets

LAYOUT OF COMPACT ALL TERRAIN VEHICLE FOR FUEL TANK, INTAKE DUCT, AND EXHAUST DUCT POSITIONING

TECHNICAL FIELD

The present invention relates to a compact all terrain vehicle, and more specifically, to an improvement of the layout of the engine unit, the transmission case air intake and exhaust ducts and the fuel tank.

BACKGROUND ART

A compact all terrain vehicle is disclosed for instance in Japanese Unexamined Patent Application Publication 2006-027425. In this compact vehicle, an engine unit equipped with a V-belt type automatic transmission is mounted below the seat, platform style footrests are arranged on the left and right sides of the seat, and a fuel tank is arranged below the seat. Furthermore, a portion of the fuel tank is located above the engine unit.

There is demand in the market for vehicles which have a compact body and are at the same time equipped with more sophisticated accessories of various types, such as an electronic fuel injection system and electrical power assisted steering. When an electronic fuel injection system is provided, a high pressure fuel pump would be arranged inside the fuel tank, but if a fuel tank with a built-in fuel pump is arranged below the seat, the width dimension of the vehicle's seat can easily become larger. Furthermore, with more electrically driven devices, the capacity of the battery that serves as a power source becomes larger, so its layout also needs to be considered. In the vehicle described in the aforementioned prior patent publication, the battery is arranged to the front of the steering handlebar. Furthermore, a portion of the fuel tank is located above the engine unit (crankcase) under the seat, so there is the problem that the seat width tends to become larger and space under the seat becomes more constricted and is hard to utilize efficiently.

Furthermore, an exhaust duct connected to the transmission case extends along the side of the fuel tank toward the rear of the vehicle, and this point also tends to make the width dimension of the seat larger.

SUMMARY OF THE INVENTION

The present invention provides an all terrain vehicle which allows the space under the seat to be efficiently utilized while making the body more compact.

The present invention is an all terrain vehicle that includes: a vehicle body frame; a pair of left and right front wheels supported on the front part of said vehicle body frame and a pair of left and right rear wheels supported on the rear part of the vehicle body frame; a steering shaft, supported on the vehicle body frame, which steers the front wheels; a handlebar member attached to the top end part of the steering shaft with respect to the vertical direction of the vehicle; an engine unit, supported on the vehicle body frame to the rear of the steering shaft with respect to the front-back direction of the vehicle, comprising a crankcase, a cylinder extending upward from the crankcase, and a transmission case which is provided to the side of the crankcase in the widthwise direction of the vehicle and houses a V-belt type automatic transmission and has a first opening and a second opening; a seat supported on the vehicle body frame such that at least a portion of the seat is located above the engine unit; footrests supported on the vehicle body frame so as to be located on the left and right sides of the engine unit in the widthwise direction of the vehicle; a fuel tank which is supported on the vehicle body frame and arranged such that its front end is located to the rear of the rear end of the crankcase of the engine unit with respect to the front-back direction of the vehicle; an air intake duct which is connected to the first opening of the transmission case and has an intake port disposed above the first opening and such that at least a portion of it is further to the front, with respect to the front-back direction of the vehicle, than the rear end part of the handlebar member at the time of maximum turning; and an exhaust duct which is connected to the second opening of the transmission case and has an exhaust port disposed above the second opening and such that at least a portion of it is further to the front, with respect to the front-back direction of the vehicle, than the rear end part of the handlebar member at the time of maximum turning.

In one embodiment, the fuel tank is arranged to the rear of the crankcase of the engine unit with respect to the front-back direction of the vehicle, and the intake port of the air intake duct connected to the first opening of the transmission case and the exhaust port of the exhaust duct connected to the second opening of the transmission case are arranged above the first and second opening and toward the front of the vehicle from the rear end part of the handlebar member at the time of maximum turning, thus making it possible to efficiently utilize the space under the seat while making the body substantially more compact.

Reducing the dimension of the seat where the rider sits with respect to the widthwise dimension of the vehicle, thereby making it narrower, is desired for making the body substantially more compact. Thus, the fuel tank was arranged, with respect to the front-back direction of the vehicle, to the rear of the engine unit installed under the seat, and the air intake duct and exhaust duct connected to the transmission case of the engine were arranged such that the intake port and exhaust port thereof would be located toward the front of the vehicle from the rear end part of the handlebar member. As a result, the dimension of the seat in the widthwise direction of the vehicle can be made narrower, and the space under the seat can be efficiently utilized for arranging vehicle mounted parts, and the like, while making the body substantially more compact.

DETAILED DESCRIPTION

Figure 1:
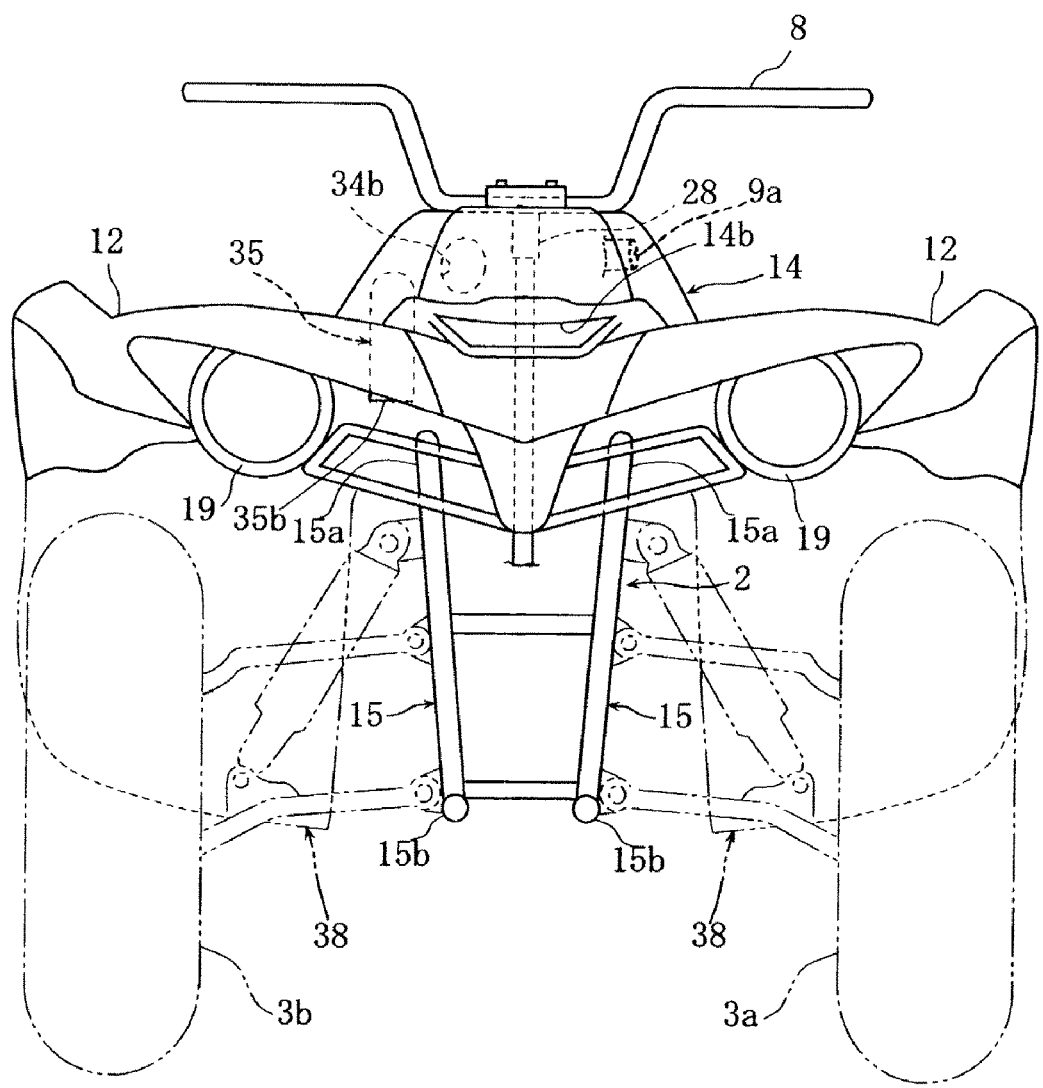
FIG. 1 is a front view of a vehicle according to an embodiment of the present invention.

Embodiments of the present invention will be described below with reference to the drawings. FIGS. 1 through 13 are drawings illustrating a vehicle according to an embodiment of the present invention. In the present specification, unless indicated otherwise, front, back, left and right signify the front, back, left and right as viewed while sitting on the seat.

In one embodiment, the compact all terrain vehicle 1 includes a vehicle body frame 2, a pair of left and right front wheels 3a, 3b arranged at the front of the vehicle body frame 2 and a pair of left and right rear wheels 4a, 4b arranged at the rear; a steering shaft 28, supported on the vehicle body frame 2, which steers the left and right front wheels 3, and a handlebar member 8 attached to the top end part of the steering shaft 28.

Furthermore, the vehicle 1 includes an engine unit 5 mounted on the vehicle body frame 2 to the rear of the steering shaft 28 with respect to the front-back direction of the vehicle, a saddle seat 6 arranged over the engine unit 5, left and right platform style footrests 7a, 7b arranged on the left and right sides of the engine unit 5 with respect to the widthwise direction of the vehicle, and a fuel tank 10 supported on the vehicle body frame 2.

The left and right front wheels 3a, 3b are supported so as to be vertically slidable on the vehicle body frame 2 by means of left and right front suspensions 38. The left and right rear wheels 4a, 4b are supported so as to be vertically slidable on the vehicle body frame 2 by means of rear suspensions 39. In one embodiment, low pressure wide balloon tires are installed on the front wheels 3a, 3b and rear wheels 4a, 4b.

The vehicle body frame 2 includes a pair of left and right steel tube frame members 15 extending in the front-back direction of the vehicle and multiple cross members 16 which extend in the widthwise direction of the vehicle and join the left and right frame members 15 to each other.

The left and right frame members 15 are substantially symmetrical between left and right. Each frame member 15 includes an upper frame 15a which extends in the front-back direction of the vehicle below the seat 6, and an underframe 15b which extends in the front-back direction of the vehicle below the engine unit 5. The front part of the upper frame 15a and underframe 15b is connected by a front suspension pipe 15f and front pipe 15c, and the rear part is connected by an intermediate pipe 15d and rear pipe 15e. The intermediate pipe 15d and rear pipe 15e are further connected by a rear suspension pipe 15g. 15h, 15i and 15j are reinforcing members.

Footrest brackets 17 which support the footrests 7a, 7b are connected to the middle part, with respect to the front-back direction, of the left and right underframes 15b so as to project outward in the widthwise direction of the vehicle.

An air cleaner 9 is arranged above the engine unit 5, and a battery 40 is arranged to the rear of the air cleaner 9 with respect to the front-back direction of the vehicle.

The air cleaner 9 is mounted across the left and right upper frames 15a, to the rear of the steering shaft 28 with respect to the front-back direction of the vehicle, and is attached to the frame members 15 by an elastic member (not illustrated).

The air cleaner 9 includes a cleaner main body 9b containing an element (not illustrated) which cleans the air to be introduced into the combustion chamber of the engine unit 5; an intake duct 9c, formed connected to the front wall of the cleaner main body 9b, which extends in the widthwise direction of the vehicle; an intake port 9a formed facing to the rear of the vehicle at the left end of the intake duct 9c with respect to the widthwise direction of the vehicle; and a discharge duct 9d, formed connected to the bottom wall of the cleaner main body 9b, which discharges cleaned air.

The battery 40 is housed together with electrical components such as relay switches and fuses and a tool kit (not illustrated) in a storage box 41 supported on the vehicle body frame 2. The battery 40 has a rectangular parallelepiped shape with a long side 40a and a short side 40b, and is arranged in plan view with the long side 40a oriented in the front-back direction of the vehicle and the short side 40b oriented in the widthwise direction of the vehicle.

The battery 40 is arranged so as to be located between the left and right frame members 15 and below the seat 6, and to the front of the fuel tank 10. The battery 40 is arranged offset to the left in the widthwise direction of the vehicle in relation to the centerline C passing through the middle of the vehicle with respect to the widthwise direction, i.e. in the direction opposite to the parts 32', 35' of the exhaust pipe 32 and exhaust duct 35 between the frame members 15, so that it overlaps the engine unit 5 in plan view (see FIG. 7).

Figure 5:
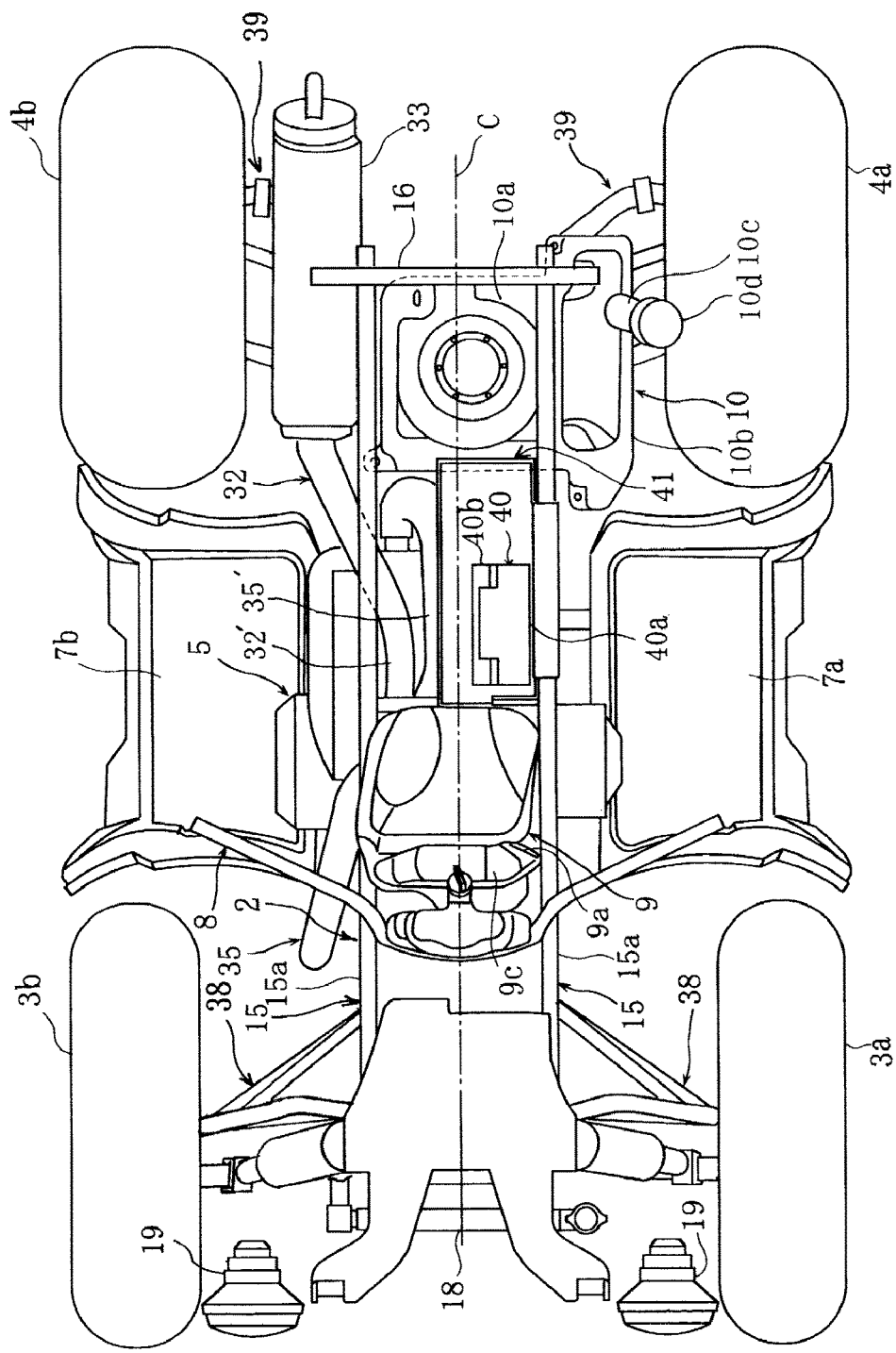
FIG. 5 is a plan view of said vehicle in a state where the vehicle body cover and the front and rear fenders have been removed.
Figure 6:
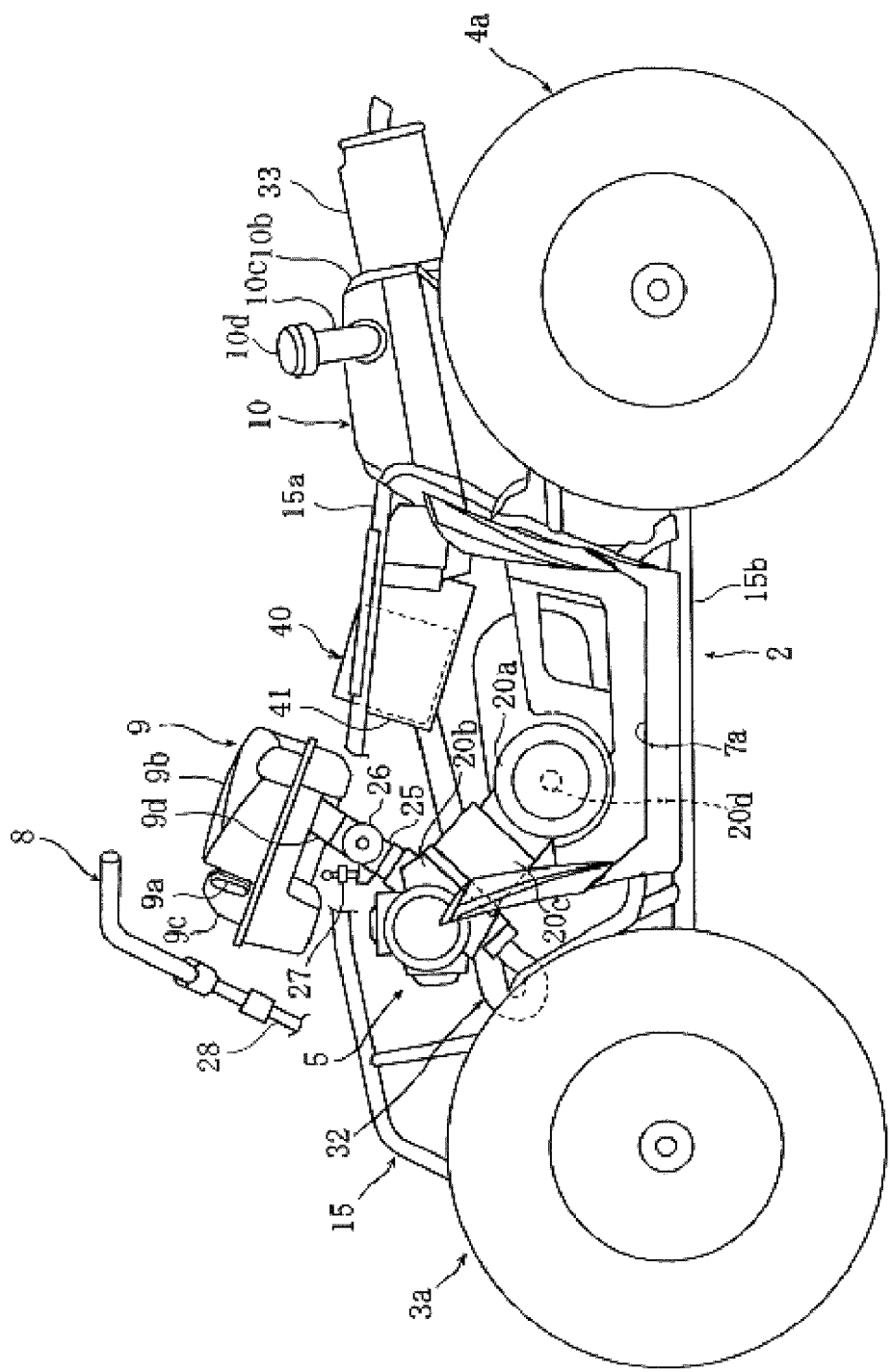
FIG. 6 is a left side view of the engine unit mounted on the vehicle body frame of said vehicle.
Figure 7:
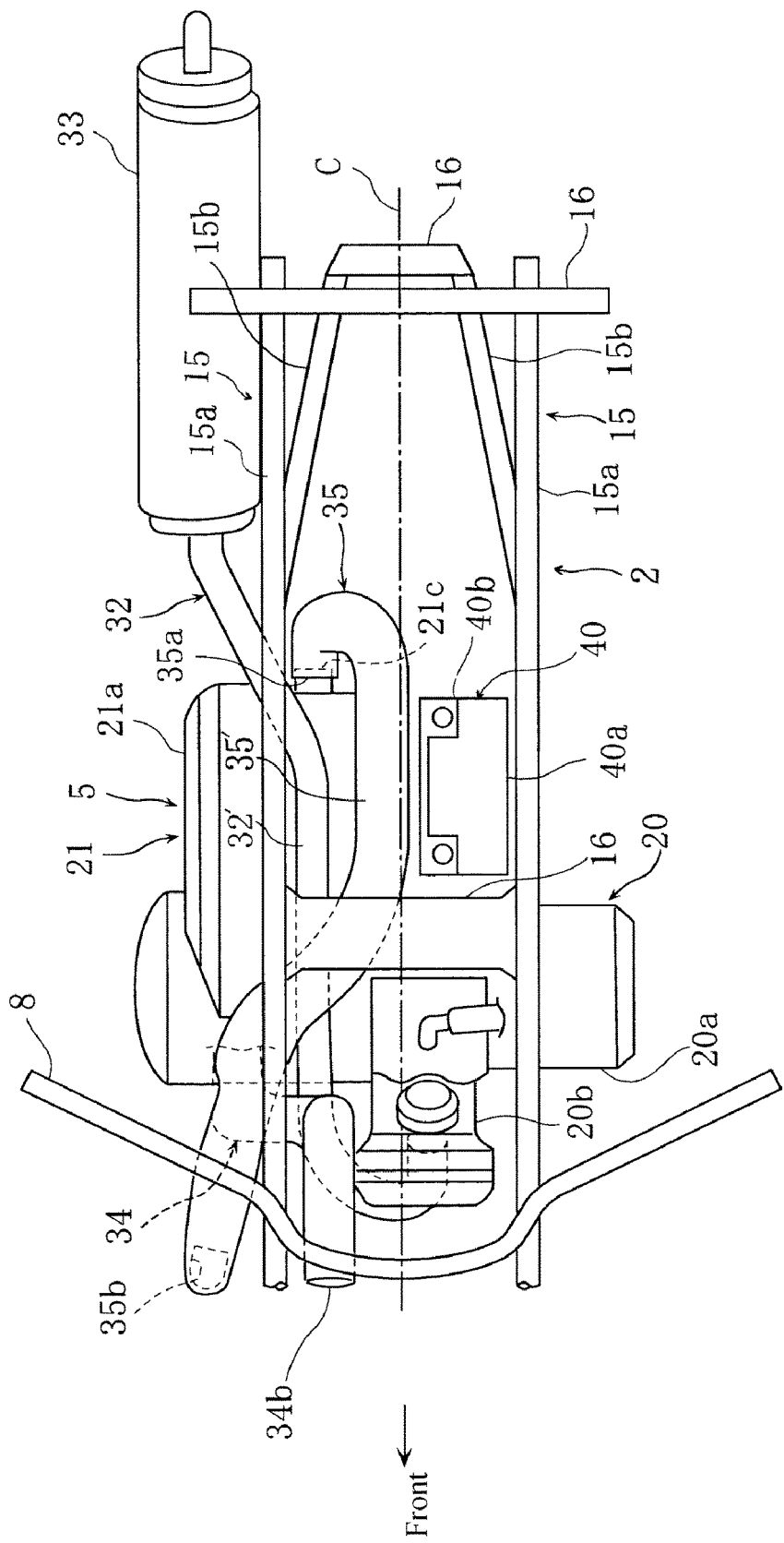
FIG. 7 is a plan view of said engine unit.
Figure 8:
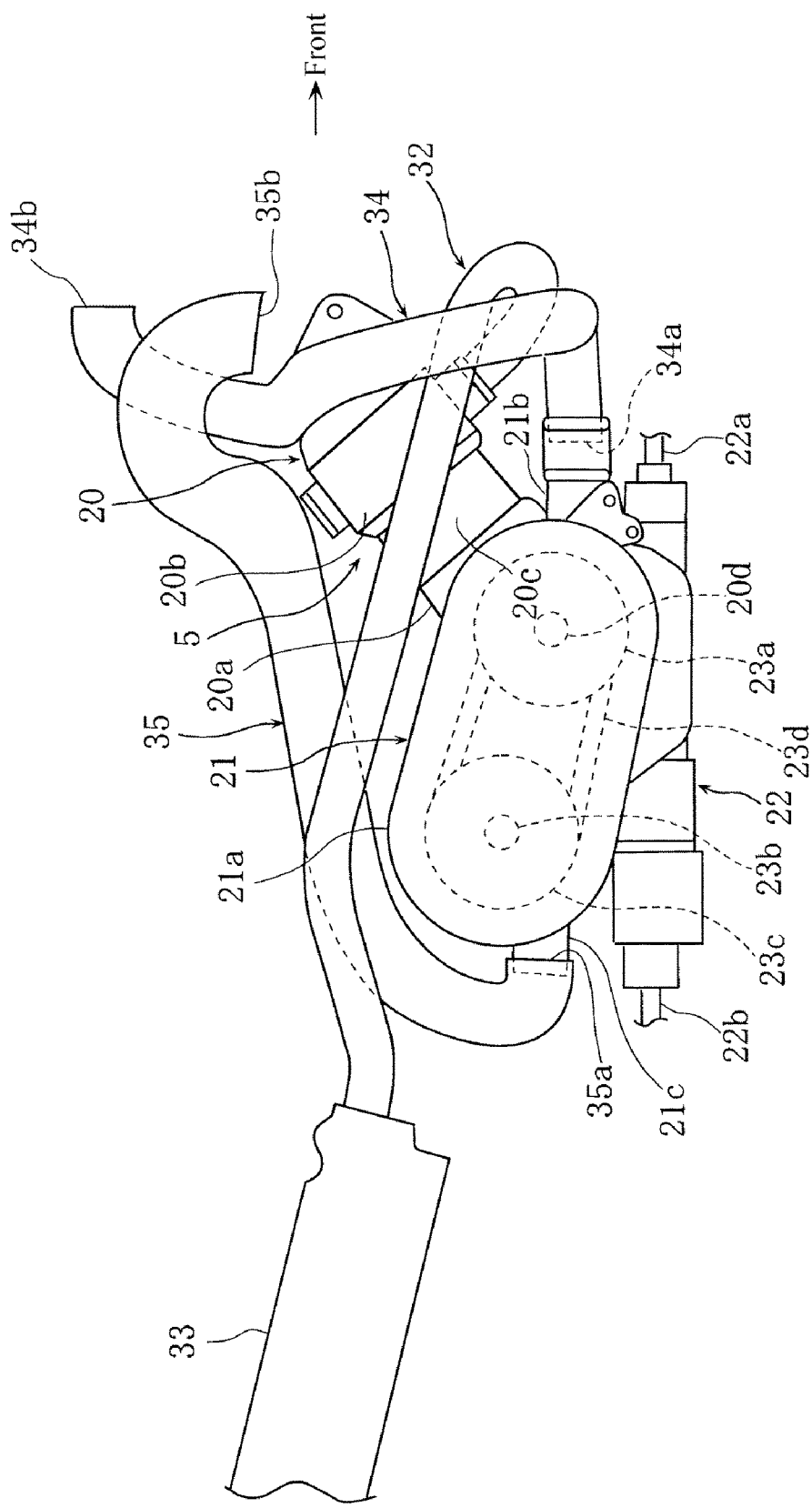
FIG. 8 is a right side view of said engine unit.
Figure 9:
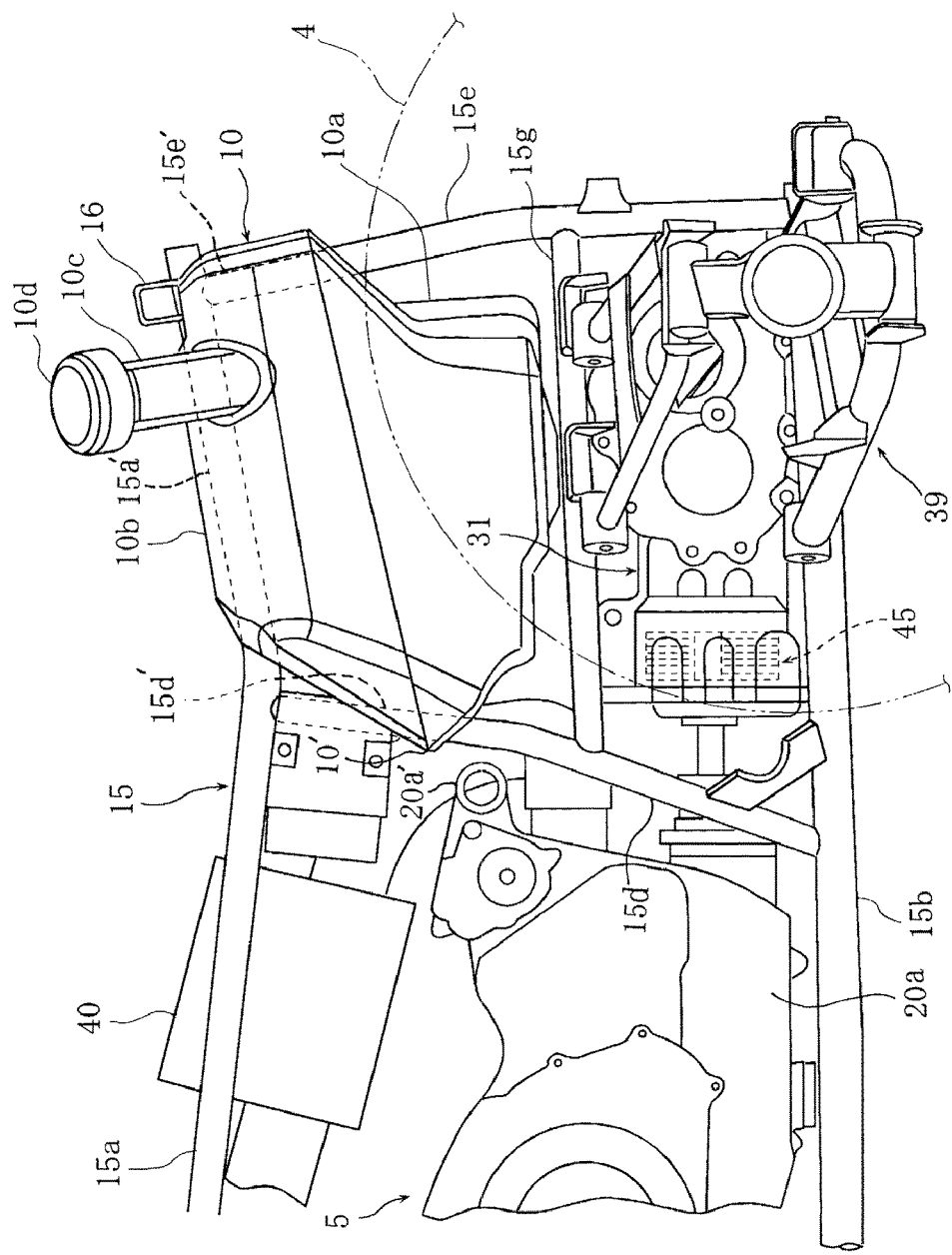
FIG. 9 is a left side view of the fuel tank disposed on said vehicle body frame.
Figure 10:
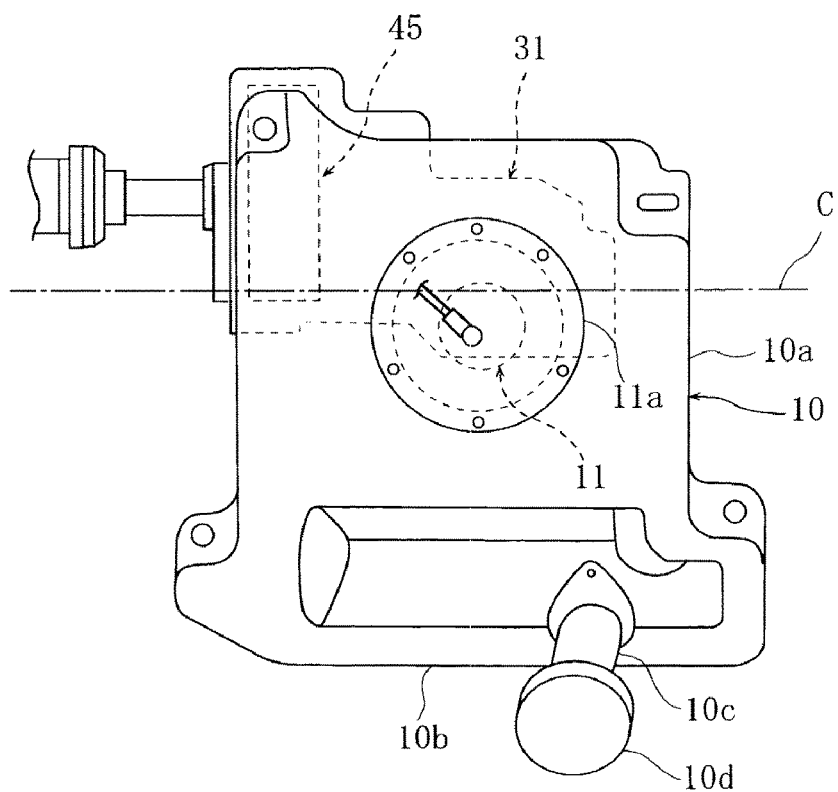
FIG. 10 is a plan view of said fuel tank.
Figure 11:
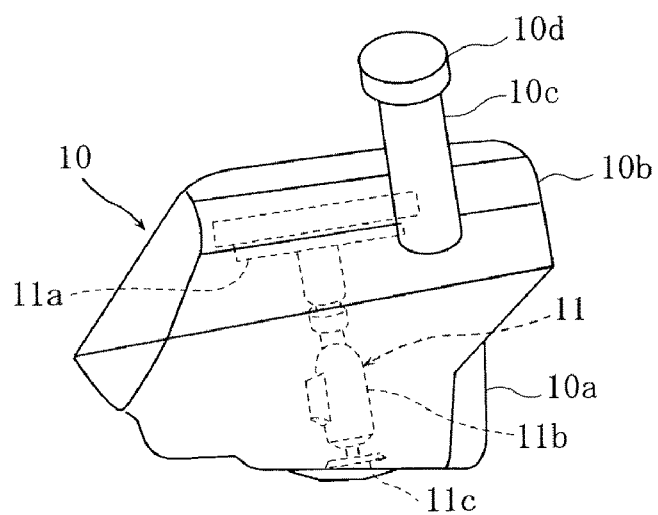
FIG. 11 is a left side view of said fuel tank.
Figure 12:
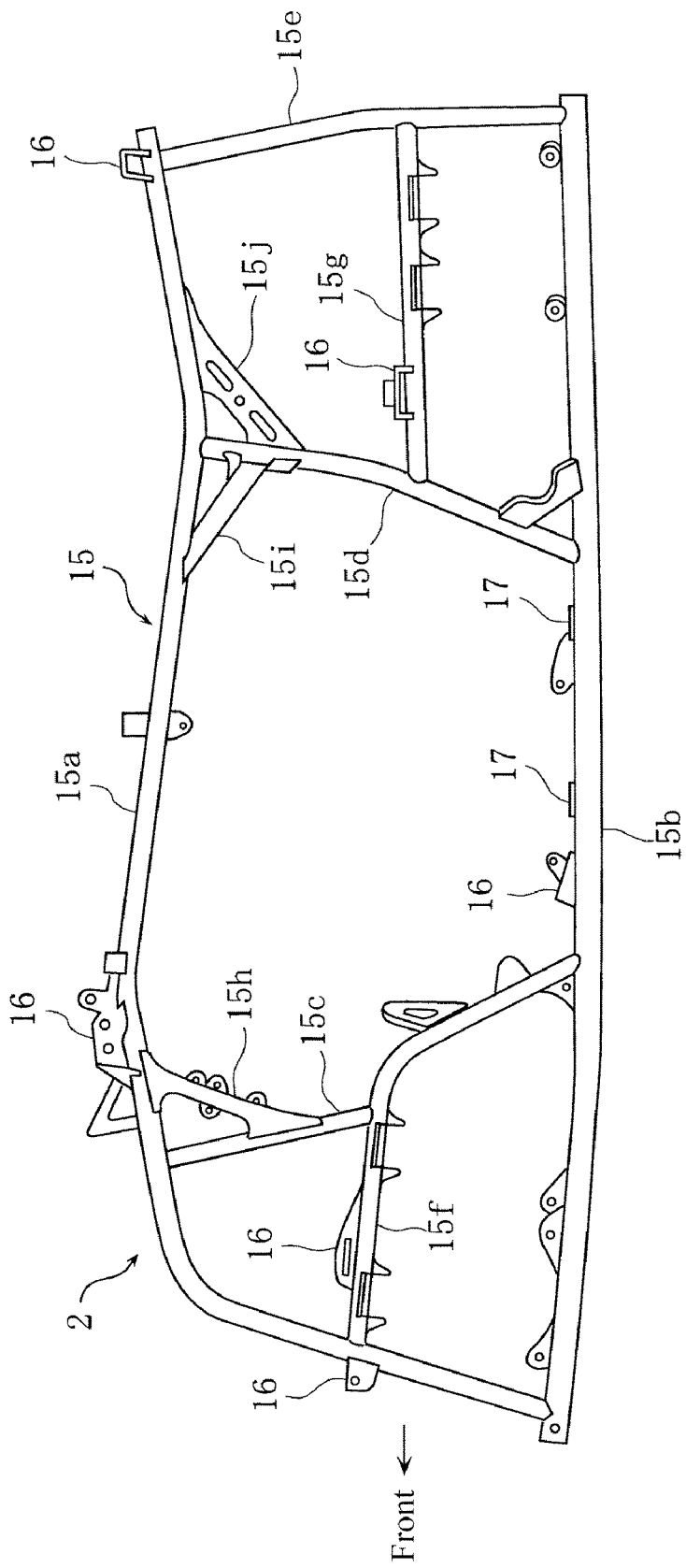
FIG. 12 is a left side view of said vehicle body frame.
Figure 13:
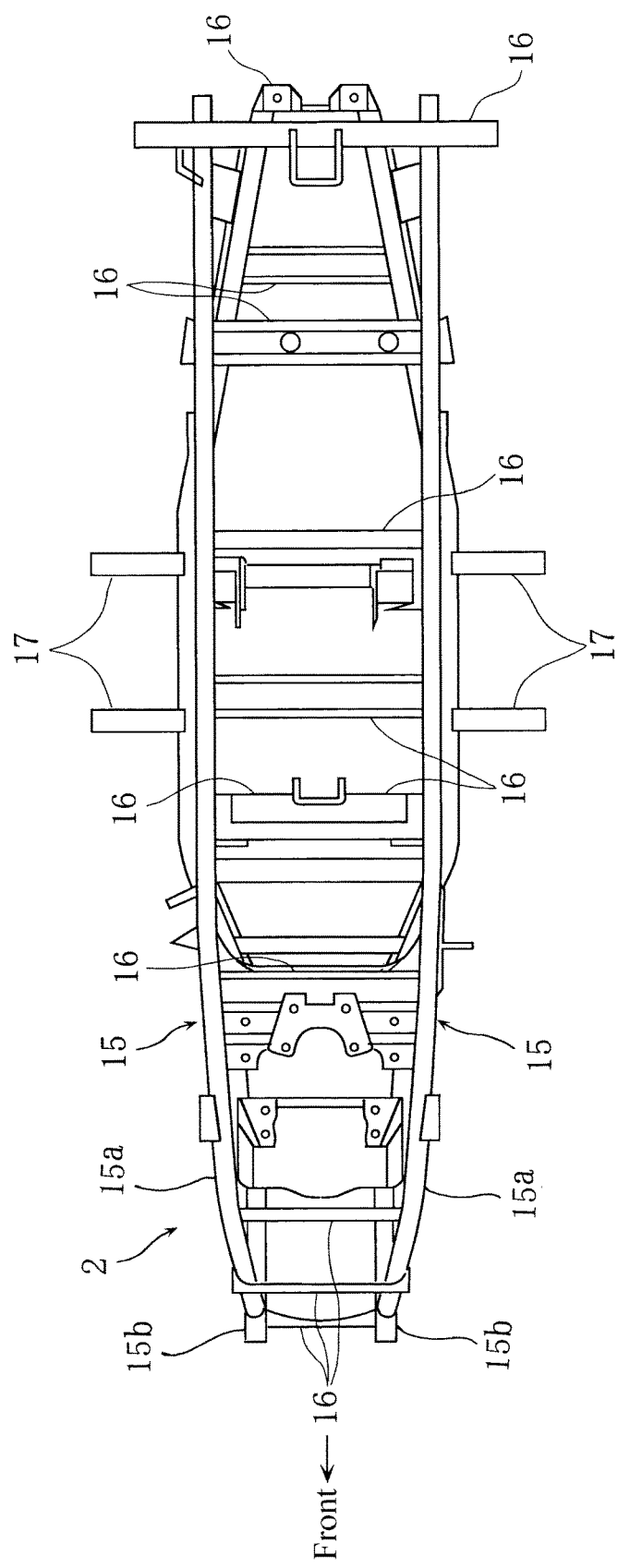
FIG. 13 is a plan view of said vehicle body frame.

Left and right front fenders 12 which cover the left and right front wheels 3a, 3b and left and right rear fenders 13 which cover the left and right rear wheels 4a, 4b are attached to the vehicle body frame 2. Note that in FIG. 5, illustration of the left and right front fenders and left and right rear fenders has been omitted.

Furthermore, a vehicle body cover 14 which covers the area below and around the seat 6 and the area above the air cleaner 9, as well as covering space between the left and right front fenders 12 is attached to the vehicle body frame 2. A service opening 14a, which is opened and closed by the seat 6, is formed in the vehicle body cover 14 below the seat 6 (see FIG. 3).

A radiator 18 is arranged on the front part of the vehicle body frame 2, and a pair of left and right headlights 19 is arranged in front of the radiator 18.

In one embodiment, the engine unit 5 has a structure wherein a water cooled four cycle single cylinder type engine 20 and a V-belt type automatic transmission 21 are integrally connected, and is mounted on the vehicle body frame 2 with the crankshaft 20d being oriented in the widthwise direction of the vehicle and horizontally.

The engine 20 includes a crankcase 20a which houses the crankshaft 20d, and a cylinder body 20c and cylinder head 20b connected to the top front part of the crankcase 20a so as to extend diagonally upward.

The automatic transmission 21 is housed in a transmission case 21a connected to the right side wall of the crankcase 20a with regard to the widthwise direction of the vehicle. The automatic transmission 21 has a structure wherein a drive pulley 23a mounted on the crankshaft 20d and a follower pulley 23c mounted on a follower shaft 23b are coupled by a V-belt 23d.

A front wheel drive shaft 22a extending toward the front of the vehicle and a rear wheel drive shaft 22b extending toward the rear of the vehicle are coupled to the follower shaft 23b of the automatic transmission 21 via a power transmission mechanism 22.

The front wheel drive shaft 22a is coupled to the left and right front wheels 3a, 3b by means of a front gear unit 30 and rotationally drives the front wheels 3a, 3b. Furthermore, the rear wheel drive shaft 22b is coupled to the left and right rear wheels 4a, 4b by a rear gear unit 31 including a wet brake 45 and rotationally drives the rear wheels 4a, 4b (see FIG. 4).

An air intake tube 25 is connected to the rear wall of the cylinder head 20b of the engine 20. The air intake tube 25 is arranged between the left and right frame members 15 and extends substantially vertically upward from the cylinder head 20b. A throttle body 26 is installed midway in the air intake tube 25, and the air cleaner 9 is connected to the upstream end of the air intake tube 25 (see FIG. 6).

A fuel injection valve 27 is installed in the throttle body 26. This fuel injection valve 27 injects and supplies high pressure fuel from a high pressure fuel pump 11 (see FIG. 10 and FIG. 11) arranged inside the fuel tank 10 through an air intake port into the combustion chamber of the cylinder head 20b.

An exhaust pipe 32 is connected to the front wall of the cylinder head 20b of the engine 20. This exhaust pipe 32 is brought out diagonally downward from the cylinder head 20b, then has a part 32' which passes along the right side of the cylinder head 20b and between the left and right frame members 15 in plan view, and after that part 32', a muffler 33 is connected to the downstream end which extends diagonally upward toward the rear of the vehicle. Viewed from above, this muffler 33 is arranged between the right side upper frame 15a and the right rear wheel 4b.

The fuel tank 10 is arranged so as to be positioned between the left and right rear wheels 4a, 4b. The fuel tank 10 is furthermore arranged such that its front end 10' is located to the rear of the rear end 20a' of the crankcase 20a with respect to the front-back direction of the vehicle.

The fuel tank 10 includes a tank main body 10a formed so as to be located between the left and right frame members 15 in plan view of the vehicle, an extension part 10b formed continuing from the tank main body 10a so as to be located to the outside of the left frame member 15 with respect to the widthwise direction of the vehicle, and a fuel fill port 10c formed extending upward from the extension part 10b.

A fuel cap 10d which opens and closes the fuel fill port 10c is installed on the fuel fill port 10c. The fuel cap 10d is exposed upward between the seat 6 and rear fender 13.

The tank main body 10a is arranged in a space surrounded by the left and right upper frames 15a, the intermediate pipe 15d, the rear pipe 15e and the rear suspension pipe 15g.

The extension part 10b is formed so as to project outward from the tank main body 10a. More specifically, in side view of the vehicle, it projects upward so as to overlap the rear part 15a' of the upper frame 15a from the outside, and projects forward and rearward so as to overlap the upper part 15d' of the intermediate pipe 15d and the upper part 15e' of the rear pipe 15e from the outside. Forming the extension part 10b so that it projects upward, forward and rearward in this manner and is located in the space between the left upper frame 15a and the left rear wheel 4a makes it possible to increase the tank capacity without enlarging the width dimension of the vehicle.

The fuel pump 11 is arranged inside the tank main body 10a. This fuel pump 11 has a flange 11a formed at the top of a pump main body 11b and a suction port 11c formed in the bottom part. The flange 11a is bolted to the top wall part of the tank main body 10a, and the suction port 11c faces the bottom of the tank main body 10a.

The fuel tank 10 is arranged so as to overlap the rear gear unit 31 in plan view. Furthermore, the wet brake 45 contained in the rear gear unit 31 is arranged so as to be located further to the front of the vehicle than the fuel pump 11 (see FIG. 10).

The transmission case 21a has an air intake opening (first opening) 21b which admits cooling air into the transmission case 21a and an exhaust opening (second opening) 21c which exhausts the cooling air. The air intake opening 21b is formed so as to protrude toward the front of the vehicle from the front wall part of the transmission case 21a, and the exhaust opening 21c is formed so as to protrude toward the rear of the vehicle from the rear wall part of the transmission case 21a.

An air intake duct 34 is connected to the air intake opening 21b of the transmission case 21a, and an exhaust duct 35 is connected to the exhaust opening 21c.

The air intake duct 34 and exhaust duct 35 are arranged, in plan view, such that the front parts thereof run along the right outer side of the air cleaner 9 with respect to the widthwise direction of the vehicle.

The air intake duct 34 extends slightly toward the front of the vehicle from the air intake opening 21b, extends from there to the right in the widthwise direction of the vehicle, and then extends upward along the outside of the front suspension pipe 15f, and further extends upward along the inside of the upper frame 15a.

A connection port 34a formed on the downstream end of the air intake duct 34 is connected to the air intake opening 21b, and an intake port 34b formed on the upstream end is arranged above the air intake opening 21b, specifically, near the top end of the steering shaft 28. Furthermore, the intake port 34b is arranged so as to be located between the left and right upper frames 15a and to the front of the rear end part 8' of the handlebar member 8 with respect to the front-back direction of the vehicle, and opens toward the front of the vehicle below the handlebar member 8. In one embodiment, the intake port 34b is suitably arranged forward of the rear end part 8" of the handlebar member 8 at the time of maximum turning thereof.

Figure 2:
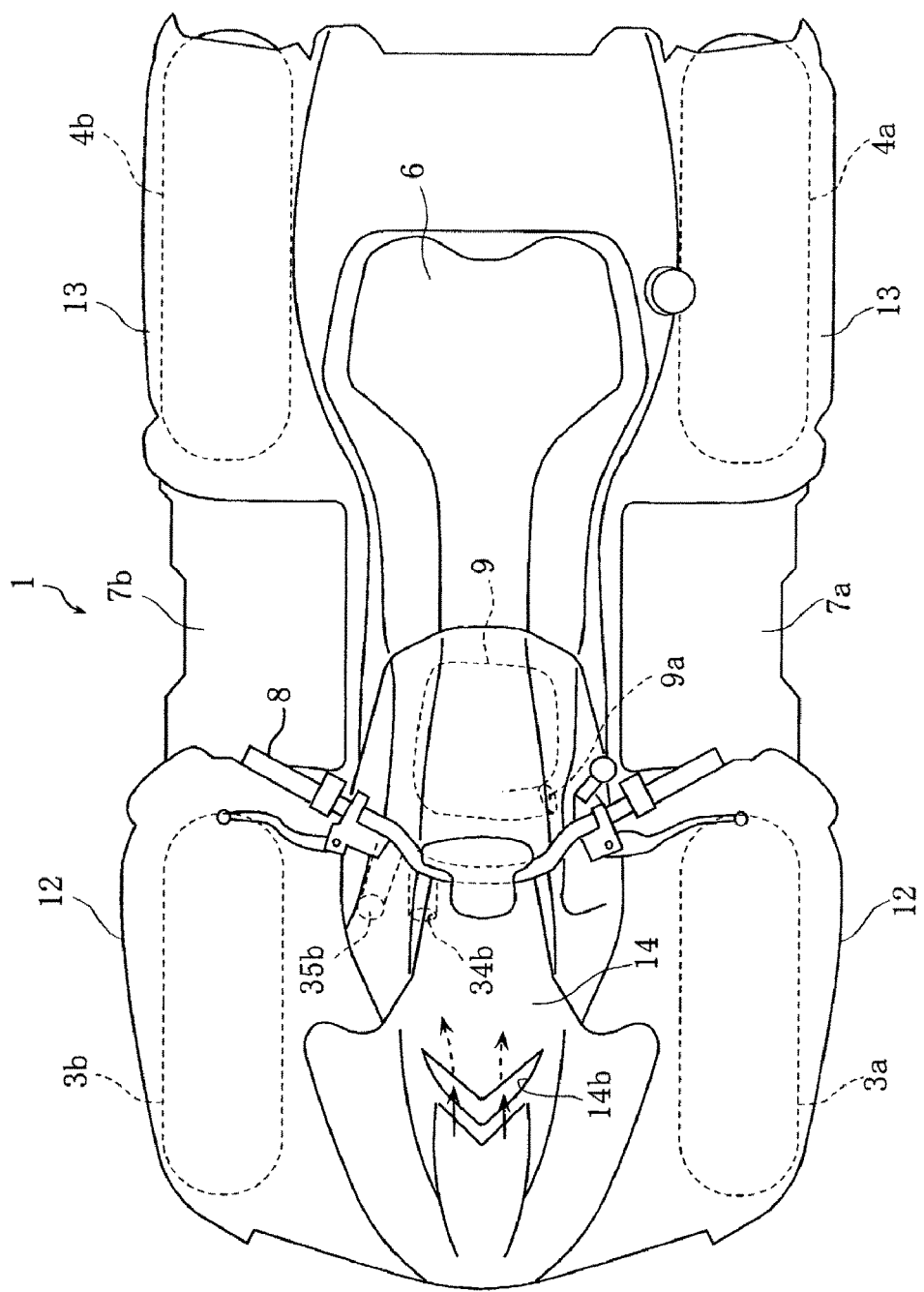
FIG. 2 is a plan view of said vehicle.
Figure 3:
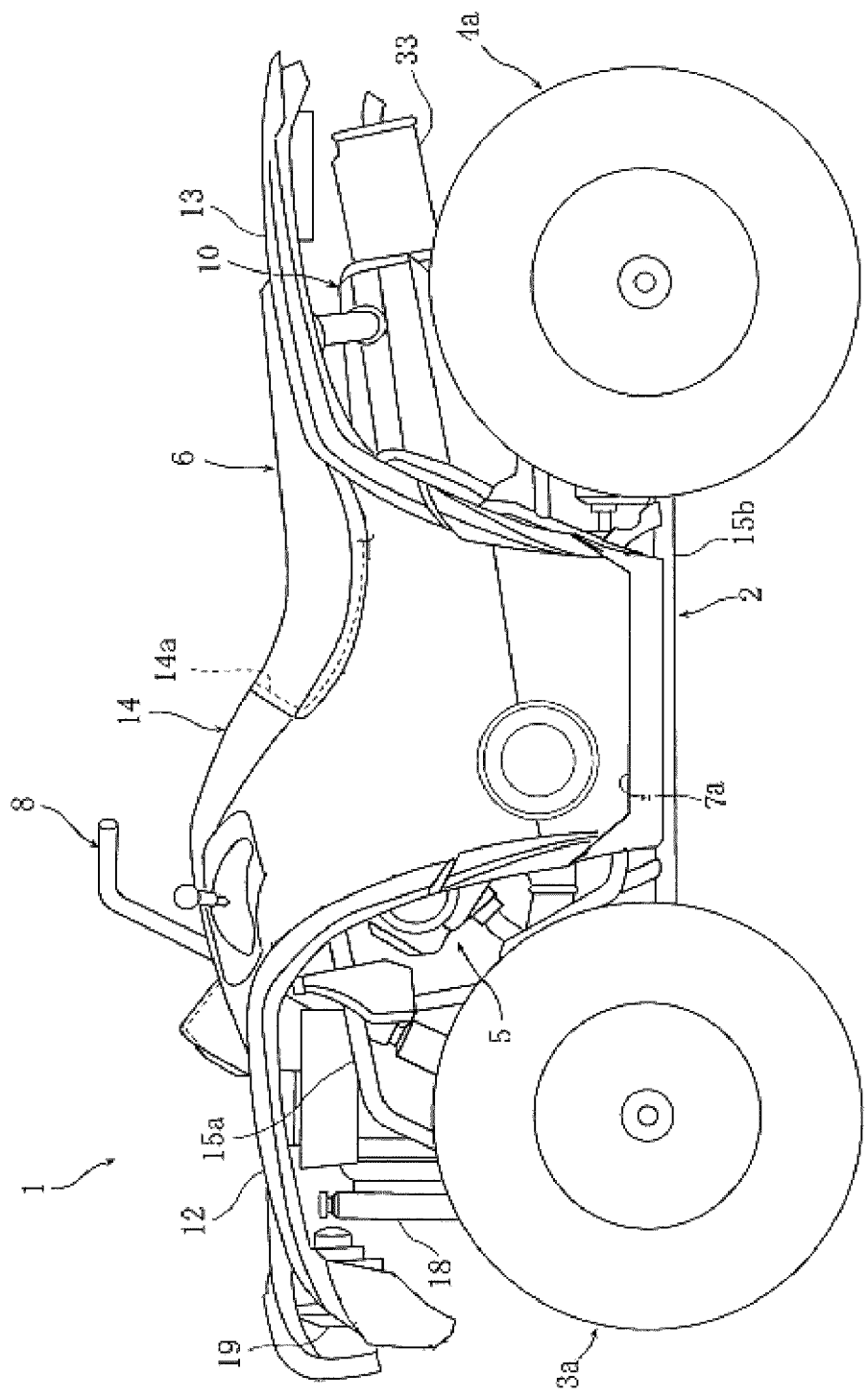
FIG. 3 is a left side view of a vehicle according to an embodiment of the present invention.
Figure 4:
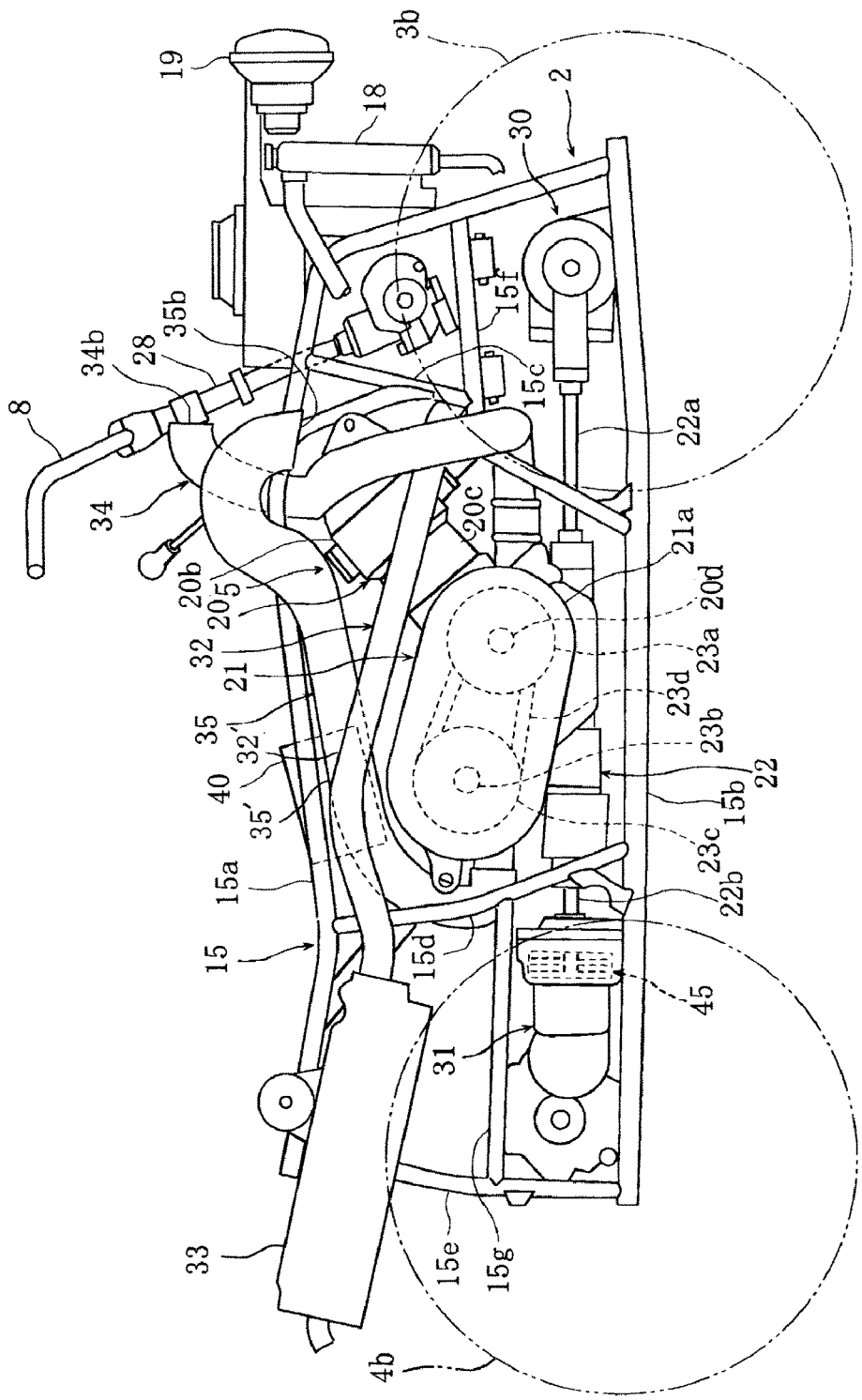
FIG. 4 is a right side view of said vehicle in a state where the vehicle body cover and the front and rear fenders have been removed.

A traveling air stream opening 14b which opens to the front of the vehicle is provided forward of the handlebar member 8 in the vehicle body cover 14 (see FIG. 1 and FIG. 2). A portion of the air stream generated during travel which is taken in through this traveling air stream opening 14b flows into the air intake duct 34 and air cleaner 9.

The exhaust duct 35 curves upward from the exhaust opening 21c so as to go around the back of the transmission case 21a and extends between the left and right frame members 15 in the front-back direction of the vehicle, the part 35' between the frame members 15 extends substantially in a straight line along the inside, with respect to the widthwise direction of the vehicle, of part 32' of the exhaust pipe 32 between the left and right frame members 15, rising toward the front of the vehicle, and further extends forward along the outside of the right upper frame 15a so as to move away from the air intake duct 34.

The connection port 35a formed on the upstream end of the exhaust duct 35 is connected to the exhaust port 21c, and the exhaust port 35b formed on the downstream end of the exhaust duct 35 is arranged above the exhaust port 21c, specifically, near the upper frame 15a. Furthermore, the exhaust port 35b is arranged so as to be located forward of the rear end part 8' of the handlebar member 8, and opens toward the bottom of the vehicle. In one embodiment, the exhaust port 35b is suitably arranged forward of the rear end part 8" of the handlebar member 8 at the time of maximum turning thereof.

The exhaust port 35b is arranged at a location lower than the intake port 34b of the air intake duct 34 and the intake port 9a of the air cleaner 9, and opens downward, so that during travel, the cooling air discharged from the exhaust port 35b flows toward the exhaust pipe 32 and muffler 33 together with the air stream generated by travel.

In one embodiment, the fuel tank 10 is arranged further to the rear of the vehicle than the rear end of the crankcase 20a of the engine unit 5 arranged below the seat 6, and the intake port 34b of the air intake duct 34 and the exhaust port 35b of the exhaust duct 35 of the transmission case 21a are arranged so as to be located above the air intake opening 21b and exhaust opening 21c and further to the front of the vehicle than the rear end part 8' of the handlebar member 8, i.e. located to the front of seat 6, thus allowing the body to be made substantially more compact.

Namely, in order to the make the body substantially more compact, as discussed above, it is effective to make the dimension of the seat where the rider sits in the widthwise direction of the vehicle as narrow as possible. In one embodiment, the fuel tank 10 is mounted lower than the seat 6 and is arranged further to the rear of the vehicle than the engine unit 5, and the air intake duct 34 and exhaust duct 35 connected to the transmission case 21a of the engine 5 are arranged such that the intake port 34b and exhaust port 35b thereof are located further to the front of the vehicle than the rear end part 8' of the handlebar member 8, i.e. to the front of the seat 6. Thus, the fuel tank, the intake port of the air intake duct and the exhaust port of the exhaust duct are not located under the seat 6, and as a result, the dimension of the seat 6 in the widthwise direction of the vehicle can be made narrower, allowing the body to be made substantially more compact.

In addition, since the fuel tank 10, the intake port 34b of the intake duct 34 and the exhaust port 35b of the exhaust duct 35 are not located below the seat 6, space can be secured under the seat 6, and that space can be efficiently utilized for arranging vehicle mounted components and the like.

In exemplary embodiments, the fuel tank 10 is arranged so as be located above, and to overlap in plan view, the rear gear unit 31 arranged further to the rear of the vehicle than the engine 5, allowing the fuel tank 10 to be arranged by efficiently utilizing the empty space above the rear gear unit 31.

In one embodiment, the wet brake 45 contained in the rear gear unit 31 is arranged further to the front of the vehicle than the fuel pump 11 arranged inside the fuel tank 10, i.e. the wet brake 45 and fuel pump 11, which have a relatively large vertical dimension, are arranged apart from each other in the front-back direction, thus making it possible to prevent increase in the height dimension of the vehicle due to overlapping of these component in the height direction of the vehicle.

In one embodiment, the left and right front wheels 3a, 3b and rear wheels 4a, 4b are independently suspended and supported on the vehicle body frame 2 by means of front suspension 38 and rear suspension 39, thus making it possible to improve the feel of the ride when traveling on rough terrain.

In one embodiment, the air cleaner 9 is arranged above the cylinder head 20b and the air intake duct 34 and exhaust duct 35 are arranged so as to pass along the outside of the air cleaner 9 with respect to the widthwise direction of the vehicle, thus making it possible to arrange the parts of the air intake duct 34 and exhaust duct 35 located to the rear of the air cleaner 9 such that they run below the seat 6, and to prevent the dimension of the seat 6 in widthwise direction of the vehicle from increasing due to the air intake duct, etc.

In one embodiment, the exhaust duct 35 is arranged between the left and right frame members 15 and above the engine unit 5, thus making it possible to arrange the exhaust duct 35 by efficiently utilizing the empty space between the left and right frame members 15 and the engine unit 5 without increasing the seat width.

In one embodiment, the battery 40 is arranged below the seat 6 between the left and right frame members 15, and forward of the fuel tank 10, thus making it possible to arrange a large capacity battery 40 while maintaining a compact body. Furthermore, in this case, the rectangular parallelepiped shaped battery 40 is arranged with the long side 40a oriented in the front-back direction and the short side 40b oriented in the widthwise direction of the vehicle, thus making it possible to arrange the exhaust duct 35 and exhaust pipe 32 to the side of the battery 40 without enlarging the widthwise dimension of the seat 6.

In one embodiment, the fuel tank 10 has a tank main body 10a located between the left and right frame members 15 and an extension part 10b located to the outside of the frame members 15 with respect to the widthwise direction of the vehicle, thus making it possible to increase the tank capacity while maintaining a compact body.

In one embodiment, the extension part 10b is formed so as to overlap a portion of the frame members 15 in side view of the vehicle, thus making it possible to increase the tank capacity.

In one embodiment, the fuel fill port 10c is provided in the extension part 10b, so that the fuel fill port 10c is located to the outside of the frame members 15, and fueling can be more easily carried out.

The invention claimed is:

1. A vehicle comprising:
a vehicle body frame;
left and right front wheels supported by the vehicle body frame;
left and right rear wheels supported by the vehicle body frame;
a steering shaft supported by the vehicle body frame and arranged to steer the front wheels;
a handlebar member attached to a top end portion of the steering shaft;
an engine unit supported on the vehicle body frame rearward of the steering shaft, the engine unit including a crankcase, a cylinder extending upward from the crankcase, and a transmission case arranged to house a transmission and located to a side of the crankcase in a widthwise direction of the vehicle, the transmission case including a first transmission opening and a second transmission opening;
a seat supported on the vehicle body frame such that at least a portion of the seat is located above the engine unit;
a fuel tank supported on the vehicle body frame such that a front end of the fuel tank is located rearward of a rear end of the crankcase;
an air intake duct connected to the first transmission opening and including an intake port disposed above the first transmission opening; and
an exhaust duct connected to the second transmission opening and including an exhaust port disposed above the second transmission opening; wherein
each of the intake port and the exhaust port is arranged in front of a rear end of the handlebar member with respect to a front-back direction of the vehicle when the vehicle is traveling straight.

2. The vehicle according to claim 1, wherein each of the intake port and the exhaust port is arranged in front of a forward end of the handlebar member with respect to the front-back direction of the vehicle when the vehicle is traveling straight.

3. The vehicle according to claim 1, wherein at least a portion of each of the intake port and the exhaust port is arranged in front of the top end of the steering shaft.

4. The vehicle according to claim 1, wherein the intake port and the exhaust port are arranged on a same side of the vehicle.

5. The vehicle according to claim 1, wherein the vehicle frame includes left and right frame members, and at least a portion of the exhaust duct is located above the engine unit and between the left and right frame members in a plan view of the vehicle.

6. The vehicle according to claim 1, further including a rear gear unit arranged to transmit an engine driving force to the rear wheels, the rear gear unit supported on the vehicle body frame rearward of the engine unit, and the fuel tank is arranged such that at least a portion thereof is located above the rear gear unit and overlaps the rear gear unit in a plan view of the vehicle.

7. The vehicle according to claim 6, wherein the rear gear unit includes a wet brake.

8. The vehicle according to claim 7, wherein the wet brake is arranged forward of a fuel pump arranged inside the fuel tank.

9. The vehicle according to claim 1, further comprising a battery arranged below the seat and forward of the fuel tank.

10. The vehicle according to claim 1, wherein the vehicle body frame includes left and right frame members, and the fuel tank includes an extension portion located outside one of the left and right frame members with respect to the widthwise direction of the vehicle.

11. The vehicle according to claim 10, wherein a portion of the extension portion overlaps a portion of the vehicle body frame in a side view of the vehicle.

12. The vehicle according to claim 11, wherein a fuel fill port is provided in the extension portion.

13. A vehicle comprising:
a vehicle body frame;
left and right front wheels supported by the vehicle body frame;
left and right rear wheels supported by the vehicle body frame;
a steering shaft supported by the vehicle body frame and arranged to steer the front wheels;
a handlebar member attached to a top end portion of the steering shaft;
an engine unit supported on the vehicle body frame rearward of the steering shaft, the engine unit including a crankcase, a cylinder extending upward from the crankcase, and a transmission case arranged to house a transmission and located to a side of the crankcase in a widthwise direction of the vehicle, the transmission case including a first transmission opening and a second transmission opening;
a seat supported on the vehicle body frame such that at least a portion of the seat is located above the engine unit;
a fuel tank supported on the vehicle body frame such that a front end of the fuel tank is located rearward of a rear end of the crankcase, the fuel tank including a fuel pump;
an air intake duct connected to the first transmission opening and including an intake port disposed above the first transmission opening;
an exhaust duct connected to the second transmission opening and including an exhaust port disposed above the second transmission opening;
a cover carried by the vehicle and disposed forward of the handlebar member, the air intake duct, and the exhaust duct, the cover including a traveling air stream opening arranged to permit air to pass into the air intake duct;
a rear gear unit arranged to transmit an engine driving force to the rear wheels, the rear gear unit supported on the vehicle body frame rearward of the engine unit, and the fuel tank is arranged such that at least a portion thereof is located above the rear gear unit and overlaps the rear gear unit in a plan view of the vehicle; and
a wet brake carried by the rear gear unit; wherein
the wet brake is arranged forward of the fuel pump arranged inside the fuel tank.

* * * * *